United States Patent [19]
Duarte

[11] Patent Number: 5,181,222
[45] Date of Patent: Jan. 19, 1993

[54] LASER OSCILLATOR

[75] Inventor: Francisco J. Duarte, Rochester, N.Y.

[73] Assignee: Eastman Kodak Company, Rochester, N.Y.

[21] Appl. No.: 831,011

[22] Filed: Feb. 4, 1992

[51] Int. Cl.$^5$ ............................................. H01S 3/20
[52] U.S. Cl. ................................... 372/53; 372/106; 372/102; 372/32; 372/27; 372/108; 372/56; 372/31; 372/20
[58] Field of Search ............... 372/53, 106, 107, 32, 372/27, 20, 56, 108, 31

[56] References Cited

U.S. PATENT DOCUMENTS 4,891,817  1/1990  Duarte ............................. 372/52

OTHER PUBLICATIONS

Duarte et al., "Narrow Linewidth High PRF Copper Laser-Pumped Dye-Laser Oscillators"; *Applied Optics* vol. 23, No. 9, May 1984.

"Flashlamp pumped narrow-linewidth dispersive dye laser oscillators: . . . instabilities" (Duarte et al.) *Applied Optics*, vol. 29, No. 21, Jul. 20, 1990, pp. 3176–3179.

"Repetitively Pulsed Tunable Dye Laser for High Resolution Spectroscopy", by T. W. Hänsch, *Applied Optics*, vol. 11, No. 4, Apr., 1972, pp. 895–898.

"Transmission Efficiency in Achromatic Nonorthogonal Multiple-Prism Laser Beam Expanders" (Duarte, *Optics Communications*, vol. 71, No. 1.2, May 1, 1989, pp. 1–5.

Primary Examiner—Léon Scott, Jr.
Attorney, Agent, or Firm—Robert L. Randall

[57] ABSTRACT

Laser apparatus is described in which the optical cavity of a laser oscillator is specially provided with a polarizing device which has on its outer face a partially reflecting coating (such as a thin partially reflecting layer of low-loss dielectric material). The polarizing device serves both as an output coupler for narrow linewidth laser emission from the optical cavity and also as a means for substantially suppressing amplified spontaneous emission (ASE). A multiple-prism Littrow-mounted grating (MPL) dye laser apparatus embodying the invention achieves a laser linewidth of less than about 0.1 GHz ($\Delta\nu$), a ratio of intensity I of the ASE to the intensity $I_\lambda$ of the desired laser emission of about $10^{-10}$, an efficiency of somewhat more than 10%, and a short optical cavity length of less than 10 cm. The apparatus is also more rugged, more stable in frequency with changes in temperature, and less costly than similar previous lasers.

16 Claims, 1 Drawing Sheet

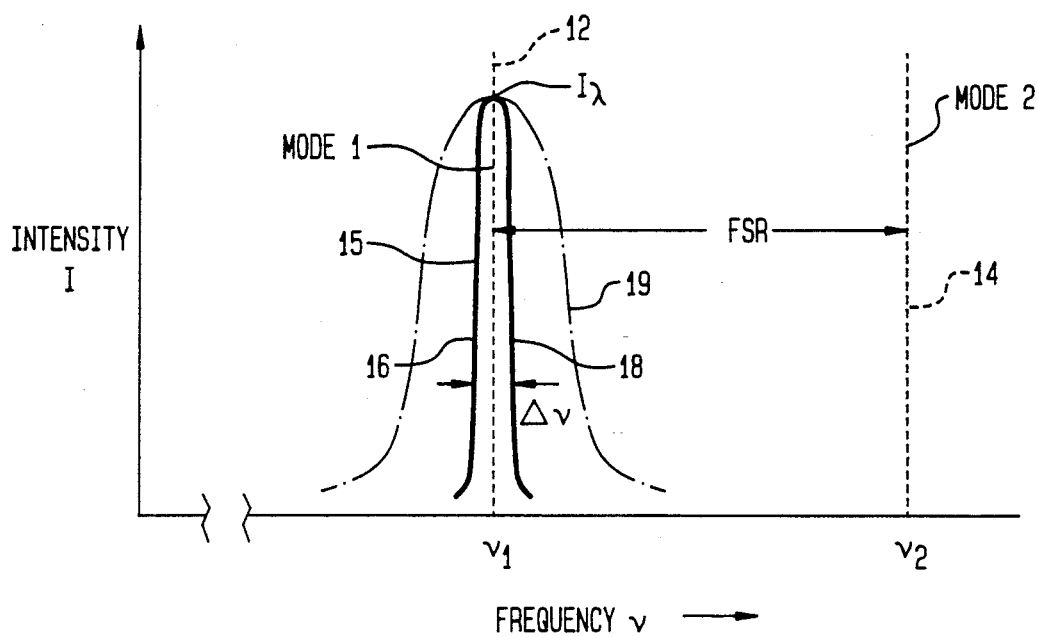
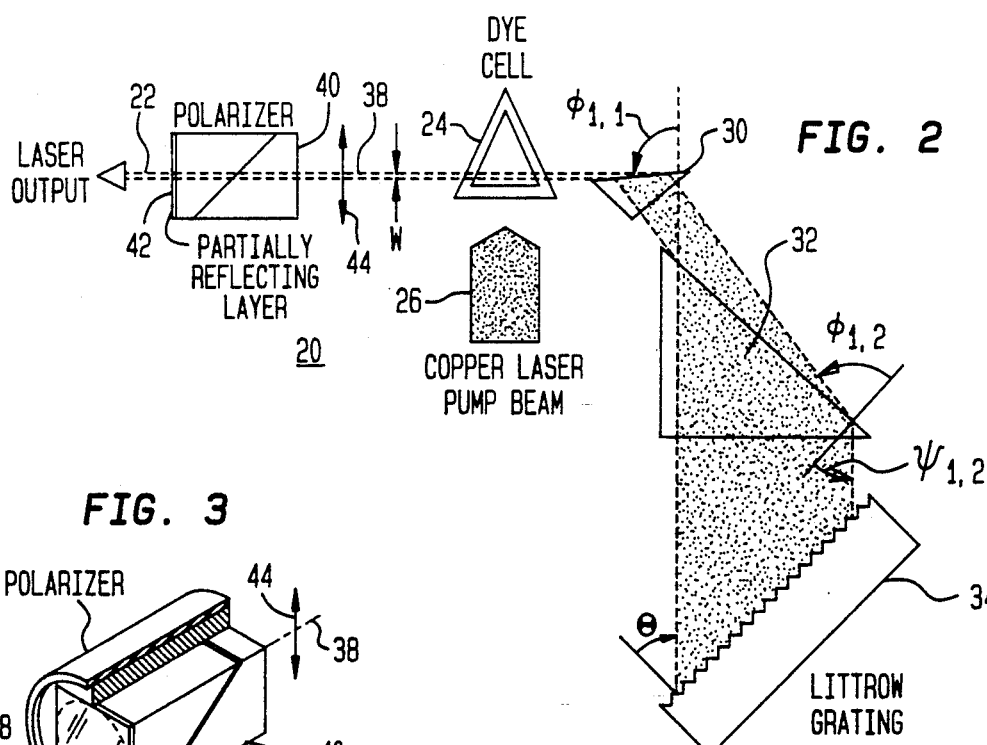
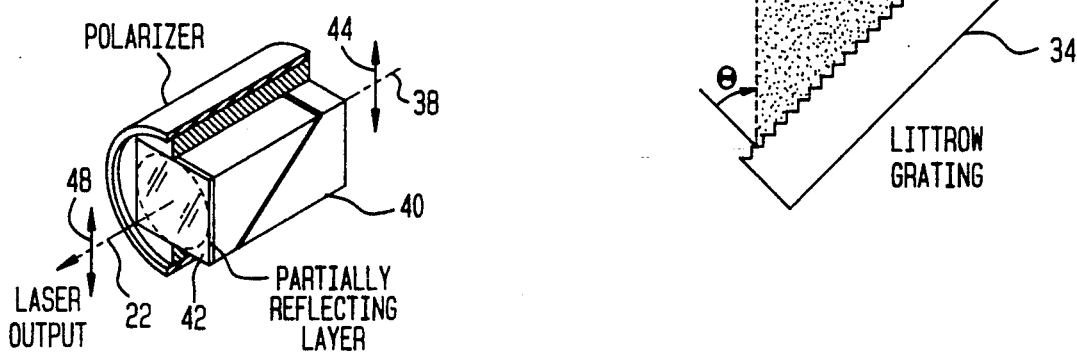

LASER OSCILLATOR

FIELD OF THE INVENTION

The present invention relates to an improved tunable laser oscillator, and, more particularly, to a dye laser oscillator having low amplified spontaneous emission (ASE), narrow linewidth, good efficiency, and which is rugged and stable.

BACKGROUND OF THE INVENTION

In the inventor's U.S. Pat. No. 4,891,817, which has an assignee in common with the present patent application, there is described a multiple-prism, Littrow-mounted grating (MPL) dye laser oscillator. In addition to efficient narrow linewidth lasing (e.g., $\Delta\nu \leq 1$ GHz), this type of oscillator has the ability to yield a relatively low level of amplified spontaneous emission (ASE). A low ASE level is desirable for many applications including spectroscopy, isotope laser separation, and lidar and laser radar.

Amplified spontaneous emission in a dye laser has a number of basic characteristics which distinguish it from laser emission. First, most ASE occurs in the early stages of the emission process prior to narrow linewidth lasing. This stochastic ASE radiation is much lower in intensity than the main laser radiation and exhibits very much higher divergence. The ASE radiation is very broadband and hence all parasitic broadband reflections or unwanted modes in the resonator (laser oscillator) cavity should be minimized. A more comprehensive discussion of ASE radiation is given in an article entitled "Flashlamp pumped narrow-linewidth dispersive dye laser oscillators: very low amplified spontaneous emission levels and reduction of linewidth instabilities", by F.J. Duarte, et. al., *Applied Optics*, Vol. 29, No. 21, Jul. 20, 1990, pps. 3176 to 3179.

The free spectral range (FSR) of an optical cavity is defined as c/2L, where "c" is the velocity of light in free space ($2.997925 \times 10^8$ m./sec.) and "L" is the optical length of the cavity. For a cavity length L of 10 cm., the FSR is 1.5 GHz. As will be explained more fully hereinafter, it is desirable that the FSR be large (larger than the dispersive linewidth). This in turn means that the optical length of the cavity should be made short (for example, less than 10 cm).

For increased efficiency in isotope separation (for example, the separation of $^{235}$U from $^{238}$U) it is highly desirable that the linewidth of the laser emission be as narrow as possible, and tunable to an exact frequency. On the other hand, in medical treatment of internal tumors it is desirable to utilize a thin optical fiber in transmitting a laser beam to the point of application. This in turn means that the "quality" of the beam should be high in order for the beam to propagate efficiently through the optical fiber. And the "quality" of the beam is related to narrow linewidth.

It is desirable to have an optical cavity in a dye laser apparatus which is shorter than that with previous arrangements, is simpler and less expensive, and has lower ASE along with narrow-linewidth laser emission and good efficiency. In addition, it is desirable to have an increase in ruggedness of the physical apparatus and greater temperature stability compared with prior arrangements.

SUMMARY OF THE INVENTION

In accordance with the present invention in one embodiment thereof, there is provided an MPL dye laser in which the partially reflecting mirror customarily used at the output of such a laser is replaced with a specially provided polarizer device, the outer face of which has a partially reflecting dielectric coating. This partially reflecting polarizer device has its plane of polarization aligned parallel to the plane of polarization of the laser emission from the optical cavity of the laser. Thus the desired narrow-linewidth laser emission is transmitted through the polarizer device, with a predetermined small percentage (e.g., 5% to 20%) of the polarized laser light being reflected by the outer partially reflecting face back into the cavity. The reflected laser light energy provides positive feedback primarily only of the desired narrow linewidth laser emission from the cavity. The ASE randomly generated in the optical cavity, being unpolarized, is highly discriminated against by passage through and then back from the output polarizer device with its reflecting outer face. This arrangement thus substantially reduces the ASE within the cavity and provides a very low ratio of intensity I of ASE to the intensity $I_\lambda$ of the narrow linewidth laser emission ($I_{ASE}/I_\lambda$). Ratios of the order of $10^{-10}$ for $I_{ASE}/I_\lambda$ are obtained. A further advantage of a short length optical cavity is that this increases the number of intracavity passes "R" of the laser light, and the increasing of R helps decrease the dispersive linewidth "$\Delta\lambda$". A full discussion of this effect is given in Chapter 4 of the book "Dye Laser Principles", edited by Duarte and Hillman, and published by Academic Press, 1990, (See particularly Equation 4.55 on page 161, and pages 173 et. seq.). In addition, because the effective length L of the optical cavity is shortened by the simplified arrangement of cavity elements provided by the invention, the free spectral range (FSR) is made greater than the dispersive linewidth. This in turn prevents unwanted multiple modes of lasing within the cavity. And the suppression of unwanted modes further contributes to the obtaining of narrow linewidth laser emission. The elimination of a separate non-polarizing output mirror not only reduces the number of physical elements employed in this new arrangement, but also increases the output efficiency of the laser. Because the length of the optical cavity has been shortened by the specially provided partially reflecting polarizer device, the effects of thermal expansion and contraction within the optical cavity on the output frequency of the laser are reduced. The invention is described in conjunction with an MPL dye laser oscillator. However the invention is also well suited to other laser oscillators such as a hybrid multiple-prism, grazing-incident (HMPGI) oscillator as shown and described in detail in the above-identified book by the inventor entitled "Dye Laser Principles".

In accordance with a specific aspect of the invention there is provided a special output device for the optical cavity of a laser oscillator. The output device comprises a multi-prism polarizer the outer face of which is coated with a thin partially reflecting layer of a low-loss dielectric material. This results in ASE levels being substantially reduced, the length of the optical cavity made shorter, and the free spectral range made substantially greater than the dispersive linewidth of the laser compared to previous oscillators.

By virtue of the present invention, it is possible to obtain in a given laser apparatus in combination the desirable features of low ASE, narrow-linewidth laser output, short length of optical cavity, good efficiency, together with the physical, thermal and cost advantages of a simplified arrangement of optical elements.

A better understanding of the invention, together with its important advantages will best be gained from a study of the following description given in conjunction with the accompanying drawings and claims.

BRIEF DESCRIPTION OF THE DRAWINGS

FIG. 1 shows a schematic graphical diagram illustrating the relationship between free spectral range (FSR) with modes of lasing in an, optical cavity and showing a narrow linewidth laser emission at a desired frequency;

FIG. 2 shows a schematic diagram of a laser oscillator in accordance with the present invention; and FIG. 3 shows a perspective view of a prism-polarizer device with a partially reflecting coated outer face provided in accordance with the invention.

DETAILED DESCRIPTION

Referring now to FIG. 1, there is shown (not to scale and partially broken away) a graphical schematic diagram of a relationship of free spectral range (FSR) with modes of lasing in an optical cavity. As mentioned previously, FSR is defined as $c/2L$, where "L" is the effective length of the optical cavity and "c" is the velocity of light in free space. By way of example, a first lasing mode 1 is indicated by a vertical dashed line 12, and a second lasing mode 2 is indicated by a vertical dashed line 14. Mode 1 occurs at a frequency $\nu_1$ and mode 2 occurs at a frequency $\nu_2$. For an optical cavity length as short as 10 cm., the FSR is as wide as 1.5 GHz. Thus lasing frequency $\nu_1$ is separated from lasing frequency $\nu_2$ by 1.5 GHz. Centered around the frequency $\nu_1$, and shown by way of example, is a desired narrow linewidth laser emission indicated at 15 and bounded by the solid, near-vertical lines 16 and 18. The amplitude or intensity $I_\lambda$ of this laser emission 15 is as indicated. The linewidth of this emission 15 is defined as the range of frequency ($\Delta\nu$) between the vertical line 16 and the vertical line 18. It is highly desirable for the laser linewidth or $\Delta\nu$, to be as narrow as possible As indicated here the laser linewidth $\Delta\nu$ is less than 100 MHz. By way of example, the dispersive emission of the optical cavity of the laser apparatus 20 is schematically shown here by the near-Gaussian bell-shaped curve 19 (indicated by the dot-dashed line). The dispersive linewidth "$\Delta\lambda$" (expressed as a range of wavelength $\lambda$ rather than frequency $\nu$) is given by the equation 4.55 on p. 161 of the above-identified book by the inventor entitled "Dye Laser Principles". Where multiple modes of lasing within the optical cavity are possible, the linewidth of the desired laser linewidth 15 is undesirably broadened into the linewidth $\Delta\lambda$ of the dispersive linewidth 19. The dispersive linewidth $\Delta\lambda$ is, for example, about 500 MHz. In the present configuration, the dispersive linewidth 19 is narrower or smaller in frequency range than the FSR. With this the case, lasing mode 2 (dashed line 14) is not excited within the optical cavity. Therefore the laser emission 15 will not be undesirably broadened in its linewidth ($\Delta\nu$) by lasing in the optical cavity at more than mode 1. The laser emission 15 has a much narrower linewidth than that of the dispersive linewidth 19.

A second advantage of a shorter length L for the optical cavity is an improvement in the stability of frequency versus temperature change experienced by the laser oscillator. By virtue of the present invention, the effective length of the optical cavity of a laser oscillator can be made shorter than 10 cm. By way of example, for the oscillators described in the above-identified article "Flashlamp pumped narrow-linewidth dispersive dye laser oscillators: very low amplified spontaneous emission levels and reduction of linewidth instabilities", the effective optical cavity length L was about 40 cm. And the linewidth of the laser emission was that of the dispersive linewidth $\Delta\lambda$, and could not be made narrower. On the other hand, a pure "grazing incidence" type of laser oscillator (such as described on page 142 of the above-identified book by the inventor entitled "Dye Laser Principles") may have a short cavity, but the efficiency is far less than that of the laser oscillator provided in accordance with the present invention. Moreover, in a pure "grazing incidence" oscillator the laser output is unpolarized, and this makes it unsuitable for use in conjunction with the present invention.

Referring now to FIG. 2, there is shown schematically a dye laser apparatus 20 in accordance with the present invention. The apparatus 20 produces a narrow linewidth laser output beam indicated at 22 by parallel dashed lines. The diameter of this beam 22 is indicated at W and is typically a fraction of a millimeter. As shown here a dye cell 24 (which can be like the one described in the above-identified U.S. Pat. No. 4,891,817) is "pumped" or excited by a beam 26 from a source such as a copper laser. This phenomenon is well known in the art. The pulse repetition frequency (prf) of such a source is in the range of 5 kHz to 20 kHz. Forming part of an optical cavity of the laser apparatus 20 is a first prism 30 which receives laser emission from the dye cell 24 at an incident angle indicated at $\phi_{1,1}$. Laser light (indicated by the shaded area) from the prism 30 is directed at an angle $\phi_{1,2}$ onto a second prism 32 and thence is refracted at an angle $\psi_{1,2}$ in an expanded beam (shaded area) onto a Littrow-mounted grating 34. The angle of light incident on and diffracted from the grating 34 is indicated by an angle $\Theta$. The relationships of these angles to the laser beams within the multiple-prism Littrow-mounted grating (MPL) portions of the optical cavity are given in detail in the above-identified book by the inventor entitled "Dye Laser Principles."

After being diffracted back from the Littrow-mounted grating 34, through the prism 32 and the prism 30, the laser light is highly polarized and frequency narrowed. The plane of polarization here lies parallel to the plane of FIG. 2. This polarized light passes to the left back through the dye cell 24 for further amplification and becomes the narrow linewidth laser beam 38 having the diameter W. As this polarized beam 38 continues to the left from the dye cell 24, it encounters a specially provided, partially reflecting polarizer device 40. The outer or left-most face of this polarizer device 40 is made partially reflecting by a suitable coating 42, such as a very thin layer of low-loss dielectric material, which gives about 5% to 20% reflection of the laser beam 38. The remaining 80% to 95% of the beam 38 passes through the reflecting coating 42 and becomes the laser output beam 22. This laser beam 22 is polarized in a plane parallel to the plane of FIG. 2. The laser beam 22, by way of example, has a narrow linewidth (such as illustrated by $\Delta\nu$ in FIG. 1) of less than 100 MHz at a wavelength (which is tuneable) in the visible light spectrum (for example, 575 nm). Output efficiency of the MPL laser apparatus 20 is somewhat greater than 10%.

The ratio of $I_{ASE}/I_\lambda$ is about $10^{-10}$. The FSR is about 1.5 GHz and the effective length of the optical cavity is less than 10 cm.

Referring now to FIG. 3, there is shown a broken away perspective view of the partially reflecting polarizer device 40. The outer surface (left most face) of the device 40 is coated with a partially reflecting layer 42 of a low-loss dielectric material such as produced by the CVI Laser Corp., of Albuquerque, N. Mex. The plane of polarization of the beam 38 (see FIG. 2) is here indicated by the vertical double-headed arrow 44 (which in FIG. 2 lies in the plane of the drawing). The device 40 is angularly oriented so that its plane of polarization (indicated by the double headed arrow 48) is parallel with the arrow 44. As a consequence, the polarized beam 38 is transmitted through the device 40 virtually without loss. A small percentage (5% to 20%) of the polarized beam 38 is fed back into the optical cavity by the reflecting layer 42, as was previously explained. The remainder of the beam 38 (80% to 95%) passes through the device 40 and emerges as the narrow linewidth laser output beam 22. The device 40 serves as an output coupler for the laser beam 22 and as part of the optical cavity of the laser apparatus 20. This positive feedback of a portion of the polarized beam 38 back into the optical cavity and the high degree of discrimination against unpolarized ASE by the device 40 substantially reduces unwanted ASE levels in the output beam 22, as was previously explained. The device 40 is advantageously fabricated from a multi-prism polarizer commercially available, for example, as a Glan-Laser prism polarizer, Part No. MGLB-10 sold by the Karl Lambrecht Corp. of Chicago, Ill. The outer face of the Glan-Laser prism polarizer is specially coated with a partially reflecting layer 42, as described above, in order to obtain the device 40 as used in the laser apparatus 20 of FIG. 2 in accordance with the present invention.

It is to be understood that the embodiment of the invention described herein is illustrative of the general principles of the invention. Modifications may readily be devised by those skilled in the art without departing from the spirit and scope of the invention. For example, lasers other than the MPL dye laser described may be used, and the polarizer device 40 is not limited to the Glan-Laser multiprism unit described or to a particular part number. Also the multiple-prism beam expander can be composed of more than two prisms. Still further, the invention is not restricted to a particular wavelength of laser operation, or to a given length of optical cavity, or to a particular active laser medium.

What is claimed is:

1. A laser apparatus comprising:
   an optical cavity having at one end means for reflecting polarized narrow linewidth laser emission and at the other end a partially reflecting polarizer device which serves as an output coupler of the cavity for a narrow linewidth laser beam; and
   means for generating narrow linewidth laser emissions within the optical cavity of a desired wavelength, unpolarized amplified spontaneous emission (ASE) also being generated in the cavity, the partially reflecting polarizer device having its plane of polarization oriented parallel to the plane of polarization of the narrow linewidth laser beam such that non-polarized amplified spontaneous emission (ASE) is substantially reduced in intensity, the length of the optical cavity is short and the free spectral range (FSR) is longer than the dispersive linewidth of the laser.

2. The laser apparatus of claim 1 wherein the partially reflecting polarizer device comprises a multi-prism polarizer having its outer face coated with a thin, partially reflecting layer of low-loss dielectric material.

3. The laser apparatus of claim 1 wherein the partially reflecting polarizer device transmits 80% to 95% of the polarized narrow linewidth laser beam impinging on it, and highly discriminates against unpolarized ASE, such that the ratio of intensity of ASE to intensity of the narrow linewidth laser beam is of the order of $10^{-10}$.

4. The laser apparatus of claim 1 wherein the means for reflecting polarized narrow linewidth laser emission at one end of the optical cavity comprises a multiple-prism Littrow-mounted grating (MPL) arrangement.

5. The laser apparatus of claim 1 wherein the means for generating laser emission within the optical cavity comprises a dye cell pumped by a laser source having a pulse repetition frequency of about 5 kHz to 20 kHz.

6. A laser oscillator having an optical cavity in which is generated a polarized narrow linewidth laser beam and unpolarized amplified spontaneous emission (ASE) comprising:
   an output device for the optical cavity comprising a multi-prism polarizer the outer face of which is coated with a partially reflecting layer such that ASE levels are substantially reduced, the length of the optical cavity is short, the free spectral range is substantially greater than the dispersive linewidth of the laser, and the narrow linewidth laser beam has a linewidth substantially smaller than the dispersive linewidth.

7. The laser oscillator of claim 6 in which the output device comprises a Glan-Laser prism polarizer having its outer face coated with a partially reflecting layer which provides 80% to 95% transmission of the laser beam, such that output efficiency greater than about 10% is obtained.

8. A dye laser apparatus comprising:
   a dye cell forming part of an optical cavity;
   means for exciting or pumping the dye cell with a laser source of suitable wavelength and pulse repetition frequency, the dye cell being capable of producing unpolarized amplified spontaneous emission and narrow linewidth laser emission;
   multiple-prism grating means within the optical cavity for feeding back narrow linewidth polarized laser emission back to and through the dye cell; and
   output polarizer and reflecting coupler means for receiving a narrow linewidth polarized laser beam from the dye cell and for reflecting back to the dye cell a portion of the polarized laser beam and for transmitting as an output beam substantially without loss the remainder of the polarized laser beam, the output coupler means highly discriminating against the reflection back to the dye cell of unpolarized amplified simultaneous emission from the dye cell such that the intensity of amplified spontaneous emission is substantially reduced, the length of the optical cavity is short, and lasing within the cavity at more than one mode of lasing is inhibited.

9. The apparatus of claim 8 wherein the length of the optical cavity is less than 10 cm, and the modes of lasing in the cavity are separated from each other by a substantially greater frequency than the range of frequency of the dispersive linewidth.

10. The apparatus of claim 8 wherein the multiple-prism grating means comprises a Littrow-mounted grating (MPL).

11. The apparatus of claim 8 wherein the dye cell lases in the visible part of the optical spectrum, and the means for exciting the dye cell is a high pulse repetition frequency laser such as a copper laser.

12. The apparatus of claim 8 wherein the output coupler means is a multi-prism polarizer the outer face of which is coated with a thin partially reflecting layer of a low-loss dielectric, the plane of polarization of the multi-prism polarizer being aligned with the plane of polarization of the narrow linewidth laser beam.

13. A laser apparatus comprising:
  a dye cell forming a central part of an optical cavity having an effective length L, the dye cell being capable of emitting laser emission and amplified spontaneous emission (ASE) when excited;
  means for exciting or pumping the dye cell with light energy;
  reflecting and polarizing means at one end of the optical cavity for receiving emissions from the dye cell and for feeding back and through the dye cell polarized narrow linewidth laser emission; and
  multi-prism reflecting and polarizing output coupler means at the other end of the optical cavity for receiving polarized narrow linewidth laser emission and amplified spontaneous emission (ASE) from the dye cell, the multi-prism output coupler means reflecting a small portion of the polarized narrow linewidth laser emission back to the dye cell and for transmitting to outside of the optical cavity a desired narrow linewidth output laser beam, the output coupler means highly discriminating against the amplified spontaneous emission (ASE) from the dye cell such that the intensity of ASE in the output laser beam is very low relative to the intensity of the narrow linewidth laser emission, and the effective length L of the optical cavity is short.

14. The laser apparatus of claim 13 wherein the length L of the optical cavity is sufficiently short that the optical cavity supports lasing in substantially one mode only such that the linewidth of the desired output laser beam is very narrow 15. The laser apparatus of claim 14 wherein the multi-prism output means is a Glan-Laser polarizer with a partially-reflecting outer face.

16. The laser apparatus of claim 13 wherein the dispersive linewidth of the laser is only about 500 MHz, the length L of the optical cavity is less than 10 cm.

* * * * *